(12) United States Patent
Banat et al.

(10) Patent No.: US 10,494,455 B2
(45) Date of Patent: *Dec. 3, 2019

(54) PROCESS FOR TRANSITIONING BETWEEN INCOMPATIBLE CATALYSTS

(71) Applicant: SABIC GLOBAL TECHNOLOGIES B.V., Bergen op Zoom (NL)

(72) Inventors: Yahya Banat, Riyadh (SA); Abdulaziz Hamad Al-Humydi, Riyadh (SA); Said Fellahi, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 181 days.

This patent is subject to a terminal disclaimer.

(21) Appl. No.: 15/538,013

(22) PCT Filed: Dec. 22, 2015

(86) PCT No.: PCT/EP2015/080943
§ 371 (c)(1),
(2) Date: Jun. 20, 2017

(87) PCT Pub. No.: WO2016/102546
PCT Pub. Date: Jun. 30, 2016

(65) Prior Publication Data
US 2018/0186906 A1    Jul. 5, 2018

(30) Foreign Application Priority Data
Dec. 22, 2014   (EP) ..................... 14199685

(51) Int. Cl.
*C08F 10/02*   (2006.01)
*C08F 2/34*    (2006.01)
*C08F 2/42*    (2006.01)

(52) U.S. Cl.
CPC ............... *C08F 10/02* (2013.01); *C08F 2/34* (2013.01); *C08F 2/42* (2013.01)

(58) Field of Classification Search
CPC .... C08F 2/42; C08F 10/02; C08F 2/34; C08F 10/00; C08F 210/16; C08F 210/14; C08F 2500/12; C08F 2500/24
(Continued)

(56) References Cited

U.S. PATENT DOCUMENTS 3,450,183 A   6/1969 Hinton
3,594,356 A   7/1971 Hinton
(Continued)

FOREIGN PATENT DOCUMENTS

EP   0596111 A1   7/1991
EP   1059300 A1  12/2000
(Continued)

OTHER PUBLICATIONS

International Search Report; International Application No. PCT/EP2015/080943; International Filing Date: Dec. 22, 2015; dated Apr. 21, 2016; 7 pages.
(Continued)

Primary Examiner — William K Cheung
(74) Attorney, Agent, or Firm — Cantor Colburn LLP

(57) ABSTRACT

The invention relates to a process for transitioning from a first continuous polymerization reaction in a gas phase reactor conducted in the presence of a first catalyst to a second polymerization reaction conducted in the presence of a second catalyst in the gas phase reactor wherein the first and second catalysts are incompatible, the process comprising: (a) discontinuing the introduction of the first catalyst from a first catalyst feeding system into a reactor; (b) introducing a catalyst killer to at least partially de-activate the first catalyst in the reactor (c) introducing into the reactor a second catalyst from a second catalyst feeding system separate from the first catalyst feeding system.

20 Claims, 1 Drawing Sheet

(58) Field of Classification Search
USPC .......................................................... 526/66
See application file for complete search history.

(56) References Cited

U.S. PATENT DOCUMENTS

| | | |
|---|---|---|
| 3,687,920 A | 8/1972 | Johnson |
| 3,709,853 A | 1/1973 | Karapinka |
| 3,790,036 A | 2/1974 | Miller |
| 4,003,712 A | 1/1977 | Miller |
| 4,011,382 A | 3/1977 | Levine et al. |
| 4,086,408 A | 4/1978 | Karol et al. |
| 4,101,445 A | 7/1978 | Levine et al. |
| 4,179,399 A | 12/1979 | Lichtenberger et al. |
| 4,188,793 A | 2/1980 | Watson |
| 4,302,566 A | 11/1981 | Karol et al. |
| 4,372,758 A | 2/1983 | Bobst et al. |
| 4,376,191 A | 3/1983 | Geck |
| 4,460,755 A | 7/1984 | Williams et al. |
| 4,482,687 A | 11/1984 | Noshay et al. |
| 4,543,399 A | 9/1985 | Jenkins, III et al. |
| 4,560,671 A | 12/1985 | Gross et al. |
| 4,588,790 A | 5/1986 | Jenkins, III et al. |
| 4,610,574 A | 9/1986 | Peters |
| 4,719,193 A | 1/1988 | Levine et al. |
| 4,727,723 A | 3/1988 | Durr |
| 4,755,495 A | 7/1988 | Cann et al. |
| 4,774,299 A | 9/1988 | Dumain et al. |
| 4,798,081 A | 1/1989 | Hazlitt et al. |
| 4,882,400 A | 11/1989 | Dumain et al. |
| 5,019,633 A | 5/1991 | Wagner et al. |
| 5,035,732 A | 7/1991 | McCue, Jr. |
| 5,070,055 A | 12/1991 | Schramm et al. |
| 5,195,654 A | 3/1993 | Takakarhu et al. |
| 5,202,396 A | 4/1993 | Kubo et al. |
| 5,209,607 A | 5/1993 | Wei et al. |
| 5,352,749 A | 10/1994 | DeChellis et al. |
| 5,391,656 A | 2/1995 | Campbell et al. |
| 5,421,167 A | 6/1995 | Verma |
| 5,442,019 A * | 8/1995 | Agapiou ................ C08F 10/02 526/82 |
| 5,497,626 A | 3/1996 | Howard et al. |
| 5,541,270 A | 7/1996 | Chinh et al. |
| 5,626,034 A | 5/1997 | Manley et al. |
| 5,672,665 A | 9/1997 | Agapiou et al. |
| 5,672,666 A | 9/1997 | Muhle et al. |
| 5,738,249 A | 4/1998 | Kikuchi et al. |
| 5,741,350 A | 4/1998 | Rowles et al. |
| 5,747,612 A | 5/1998 | Agapiou et al. |
| 5,753,786 A | 5/1998 | Agapiou et al. |
| 5,769,927 A | 6/1998 | Gottschlich et al. |
| 5,962,606 A | 10/1999 | Williams et al. |
| 5,979,177 A | 11/1999 | Sumner et al. |
| 6,284,849 B1 | 9/2001 | Almquist et al. |
| 6,560,989 B1 | 5/2003 | Roberts et al. |
| 6,576,043 B2 | 6/2003 | Zwilling et al. |
| 6,576,805 B2 | 6/2003 | Keady et al. |
| 6,706,857 B2 | 3/2004 | Golden et al. |
| 6,712,880 B2 | 3/2004 | Foglietta et al. |
| 6,858,684 B2 | 2/2005 | Burdett et al. |
| 6,949,612 B2 | 9/2005 | Agapiou et al. |
| 7,122,607 B2 | 10/2006 | Hagerty et al. |
| 7,128,827 B2 | 10/2006 | Tallman et al. |
| 7,300,987 B2 | 11/2007 | Hagerty et al. |
| 2001/0020072 A1 | 9/2001 | Agapiou et al. |
| 2004/0214969 A1 | 10/2004 | Ehrman et al. |
| 2005/0059784 A1 | 3/2005 | Schreck et al. |
| 2005/0159122 A1 | 7/2005 | Mayer |
| 2005/0229634 A1 | 10/2005 | Huebel et al. |
| 2005/0267269 A1 | 12/2005 | Hagerty et al. |
| 2006/0160965 A1 | 7/2006 | Goode et al. |
| 2007/0004878 A1 | 1/2007 | Hagerty et al. |
| 2013/0245218 A1 | 9/2013 | Moman et al. |
| 2018/0051102 A1 | 2/2018 | Althukair |

FOREIGN PATENT DOCUMENTS

| | | |
|---|---|---|
| EP | 1731535 A1 | 12/2006 |
| EP | 2216347 A1 | 8/2010 |
| EP | 2610269 A1 | 7/2013 |
| JP | S4917426 B1 | 4/1974 |
| JP | 2003064105 A | 3/2003 |
| JP | 2008162173 A | 7/2008 |
| WO | 9201722 A1 | 2/1992 |
| WO | 9837101 A1 | 8/1998 |
| WO | 2004060931 A1 | 7/2004 |
| WO | 2012069157 A1 | 5/2012 |
| WO | 2013186025 A1 | 12/2013 |
| WO | 2014095481 A1 | 6/2014 |
| WO | 2015078816 A1 | 6/2015 |
| WO | 2016102546 A1 | 6/2016 |

OTHER PUBLICATIONS

Wild et al.; "Determination of Branching Distributions in Polyethylene and Ethylene Copolymers"; Journal of Polymer Science: Polymer Physics Edition; vol. 20; 1982; pp. 441-455.
Written Opinion; International Application No. PCT/EP2015/080943; International Filing Date: Dec. 22, 2015; dated Apr. 21, 2016; 7 pages.
IJpeij et al., "A Suzuki Coupling Based Route to 2,2'-Bis(2-indenyl)biphenyl Derivatives," J. Org. CHem. 2002, 67, 169-176.
International Search Report for International Application No. PCT/EP2016/056605; International Filing Date: Mar. 24, 2016; dated Jun. 29, 2016; 5 Pages.
Machine Translation of JPS4917426; Date of Publication: Apr. 30, 1974; 9 Pages.
Written Opinion of the International Searching Authority for International Application No. PCT/EP2016/056605; International Filing Date: Mar. 24, 2016; dated Jun. 29, 2016; 4 Pages.

\* cited by examiner

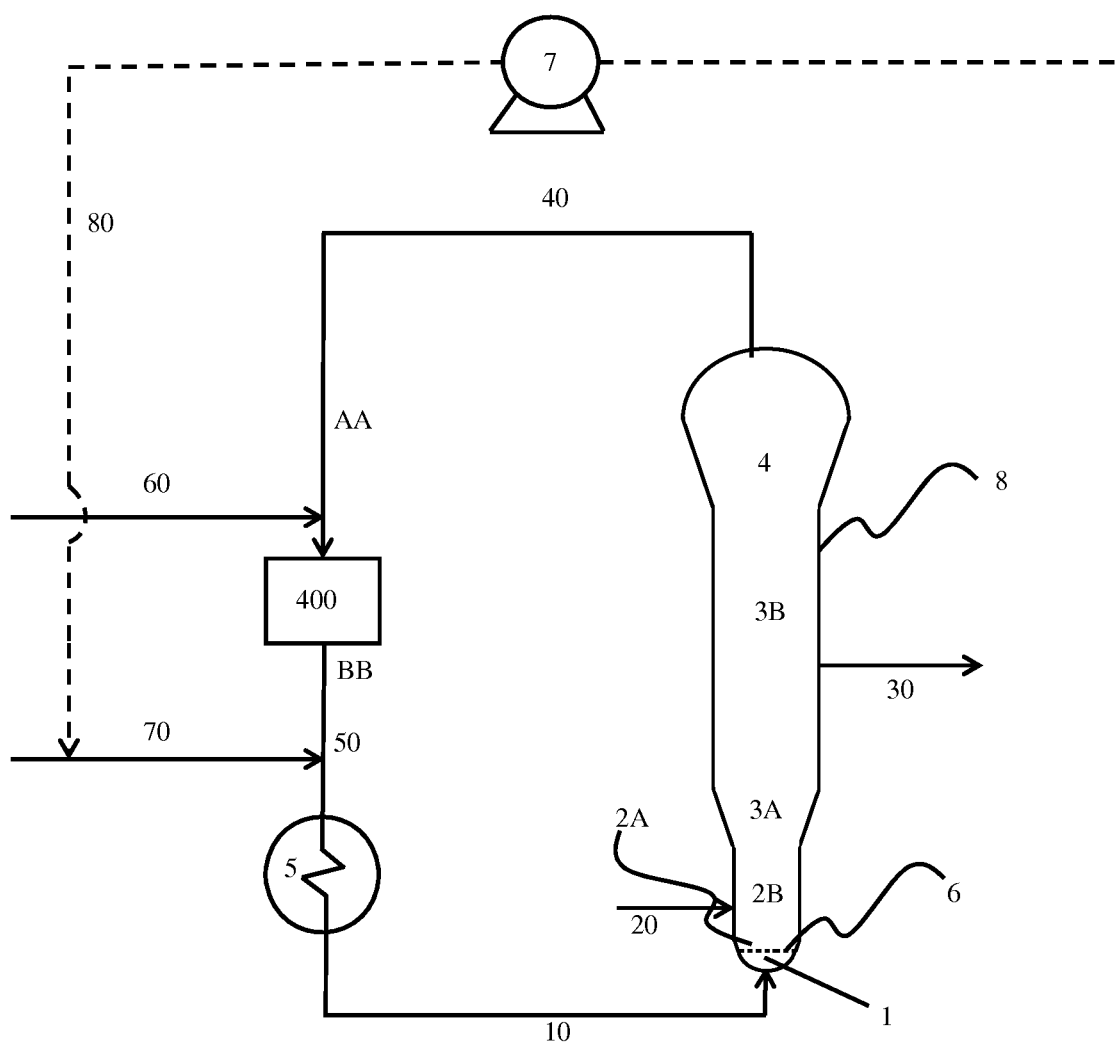

PROCESS FOR TRANSITIONING BETWEEN INCOMPATIBLE CATALYSTS

This application is a national stage application of PCT/EP2015/080943, filed Dec. 22, 2015, which claims priority to European Patent Application Number 14199685.0 filed Dec. 22, 2014, both of which are hereby incorporated by reference in their entirety.

This invention relates to a process for transitioning between incompatible polymerization catalyst systems. Particularly, the invention relates to a process for transitioning between an olefin polymerization reaction utilizing a traditional Ziegler-Natta catalyst system to an olefin polymerization reaction utilizing a bulky ligand transition metal metallocene catalyst system and vice-versa.

Metallocenes revolutionized the last decade by developing products that have improved characteristics compared to traditional Ziegler-Natta catalyst based products. Metallocene and single site catalyst based products provided: (1) narrower molecular weight distribution, (2) better comonomer incorporation and (3) lower densities compared to conventional Z—N based products. These characteristics provided several advantages at the end user level including: (1) impact strength, (2) clarity, (3) organoleptic properties, (4) heat-seal characteristics and most importantly an opportunity to downgage.

Metallocene-LLDPE has been targeted for mono layer and multi-layer blown film and packaging applications. Commercial applications of LLDPE are notably in the blown and cast film use, such as stretch film, as well as can liners and heavy duty sacks. It has provided end users with many advantages such as: (1) increased packaging speeds due to lower seal initiation temperature, higher hot tack, and reduced blocking; (2) reduced package failures due to greater toughness and superior resistance to abuse; (3) improved package artistic due to lower haze and higher gloss; and (4) improved packaged product quality due to reduced package-product interactions, lower odor and extractability, etc. LLDPE for producing films requires that no gel is formed during the production of LLDPE.

It is frequently necessary to transition from one type of catalyst system producing polymers having certain properties and characteristics to another catalyst system capable of producing polymers of different chemical and/or physical attributes. Transitioning between similar Ziegler-Natta catalyst systems or compatible catalyst systems generally takes place easily. Compatible catalysts are those catalysts having similar kinetics of termination and insertion of monomer and co-monomer (s) and/or do not detrimentally interact with each other.

However, the process is typically complicated when the catalyst systems are incompatible or of different types. For example, when transitioning between two incompatible catalyst systems such as a Ziegler-Natta catalyst system and a metallocene catalyst system, it has been found that some of the components of the Ziegler-Natta catalyst system act as poisons to the metallocene catalyst system. Consequently, the components of the Ziegler-Natta catalyst system prevent the metallocene catalyst system from promoting polymerization.

Furthermore, particularly in a continuous transition process, the interaction between two incompatible catalysts may lead to the production of high levels of small particles less than about 120 microns that are referred to as "fines". Fines can induce operability problems in the reactor and/or fouling and sheeting incidents.

In the past, to accomplish an effective transition between incompatible catalysts, the first catalyzed olefin polymerization process was stopped by various techniques known in the art. The reactor was then emptied, recharged and a second catalyst system was introduced into the reactor. Such catalyst conversions are time consuming and costly because of the need for a reactor shut-down for an extended period of time during transition and the off-grade material.

There have been many attempts to improve the process for transitioning between incompatible catalysts.

Naturally, in order to inhibit polymerization of a first incompatible catalyst, it is necessary to interrupt catalyst injection into the reactor. Stopping the first catalyst feed into the reactor does not immediately stop polymerization reactions occurring within the reactor because the fluidized bed contains catalyst particles which can still polymerize for an extended period of time. Even if one were to allow the polymerization reactions within the reactor to continue for a period of time, the catalyst within the reactor would not be completely deactivated for a considerable period.

Thus, to substantially terminate these polymerization reactions within the reactor, polymerization inhibitors or "catalyst killers" are employed. There are two general types of polymerization inhibitors: reversible catalyst killers and irreversible catalyst killers. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue. These reversible catalyst killers can be used in any combination or order of introduction in the process. Irreversible catalyst killers irreversibly inactivate a catalyst's ability to polymerize olefins. The use of catalyst killing and/or deactivating agents is disclosed in U.S. Pat. Nos. 5,442,019, 5,753,786, and 6,949,612 B2 to Agapiou et al., U.S. Pat. No. 5,672,666 to Muhle et al., and U.S. Pat. No. 6,858,684 B2 to Burdett et al.

U.S. Pat. No. 5,672,666 describes a process for transitioning from a Ziegler-Natta catalyst to a metallocene catalyst in which a deactivating agent ($CO_2$) is introduced to the reactor, the reactor is purged to remove any remaining deactivating agent and the metallocene catalyst is introduced into the reactor in the absence of any scavenger material. U.S. Pat. No. 5,672,666 mentions that substantially all of the activating and/or scavenging compounds, for example TEAL, are removed prior to the introduction of the metallocene catalyst.

It would be advantageous to provide a catalyst transitioning process which ensures the effect of the original catalyst system is eliminated. Further, it would be advantageous to provide a catalyst transitioning process without the need for halting the polymerization reaction, emptying the reactor to rid it of the original catalyst system and restarting the polymerization reaction with another catalyst system. In addition, it would be advantageous if the process for transitioning could reduce the amount of off-grade material produced during the transition process, reduce the transition time, increase the robustness and stability of the transition process and avoid the need to open the reactor to charge the seed bed.

It is an object of the present invention to provide a process in which above-described and/or other problems are solved.

Accordingly, the present invention provides a process for transitioning from a first continuous polymerization reaction in a gas phase reactor conducted in the presence of a first catalyst to a second polymerization reaction conducted in the presence of a second catalyst in the gas phase reactor wherein the first and second catalysts are incompatible, the process comprising:
(a) discontinuing the introduction of the first catalyst from a first catalyst feeding system into the gas phase reactor;
(b) introducing a catalyst killer to at least partially deactivate the first catalyst in the reactor and
(c) introducing into the reactor a second catalyst from a second catalyst feeding system separate from the first catalyst feeding system.

For the purposes of this patent specification and appended claims, the term "incompatible catalysts" are understood as those that satisfy one or more of the following: 1) those catalysts that in each other's presence reduce the productivity of at least one of the catalysts by greater than 50%; 2) those catalysts that under the same reactive conditions one of the catalysts produces polymers having a molecular weight (Mw) greater than two times higher than any other catalyst in the system; and 3) those catalysts that differ in comonomer incorporation or reactivity ratio under the same conditions by more than about 30%

Productivity is herein understood as kg of product per kg of catalyst over a certain period of time. Mw is herein understood as the weight average molecular weight as measured using SEC (Size Exclusion Chromatography using 1,2,4-trichlorobenzene as an eluent, and calibrated using linear polyethylene standards. The comonomer incorporation is measured by the analytical temperature rising elution fractionation (aTREF) conducted according to the method described in U.S. Pat. No. 4,798,081 and Wilde, L.; Ryle, T. R.; Knobeloch, D. C; Peat, LR.; Determination of Branching Distributions in Polyethylene and Ethylene Copolymers, J. Polym. ScL, 20, 441-455 (1982), which are incorporated by reference herein in their entirety. The composition to be analyzed is dissolved in 1,2-dichlorobenzene of analytical quality filtrated via 0.2 µm filter and allowed to crystallize in a column containing an inert support (Column filled with 150 µm stainless steel beans (volume 2500 µL) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (1,2-dichlorobenzene) from 20 to 130° C. at a rate of 1° C./min.

The instrument used may be Polymer Char Crystaf-TREF 300.

Stabilizers: 1 g/L Topanol+1 g/L Irgafos 168
Sample: approx. 70 mg in 20 mL
Sample volume: 0.3 mL
Pump flow: 0.50 mL/min The software from the Polymer Char Crystaf-TREF-300 may be used to generate the spectra.

The present invention is based on the realization that even a trace amount of a catalyst can be poisonous to an incompatible catalyst and no contact should be made between incompatible catalysts not only in the reactor but also in the catalyst feeding system. A catalyst is fed from a catalyst feeding system comprising for example a catalyst supply vessel and an injection tube connected to the catalyst supply vessel and the reactor. The catalyst feeding system above may optionally also comprise a pump. Another example of suitable catalyst feeding system can comprise a storage chamber, a metering device and an intermediate chamber, through which an inert carrier gas is released by a fast-opening valve to sweep the powder to the reactor (such a system is described for example in U.S. Pat. No. 4,774,299).

A further example of suitable catalyst feeding system can use a compressed gas to deliver the catalyst (such a system is described for example in U.S. Pat. No. 3,790,036). Another example of suitable catalyst feeding system can work through for steps of subdividing, intercepting, exposing and flashing the catalyst by opening and closing of a catalyst feed line (such a system is described for example in JP 49-17426). Other examples of catalyst feeder systems are described in EP 0596111, EP 0961784, U.S. Pat. Nos. 4,610,574, 5,195,654, 5,209,607, 5,738,249 or WO 9201722. It was found that, even when the catalyst (and other poisonous components derived from the remaining catalysts) is not present in the reactor, a trace amount of the catalyst sufficient to be poisonous to the second catalyst still remains in the injection tube which cannot be removed by purging.

The polymerization catalysts used in the present invention are solid catalysts. The solid polymerization catalyst may be fed to the reactor as a suspension in a solvent, for example a hydrocarbon solvent or the like, or in an inert gas, such as nitrogen. The solid polymerization catalyst may also be injected into the reactor as a dry catalyst. A trace amount of remaining catalyst was found not to have adverse effect on the density and the melt index. Purging is sufficient to remove the catalyst to the level which does not influence the density and the melt index. The present inventors surprisingly found that a trace amount of remaining catalyst remaining in the catalyst feeding system leads to an excessive gel content, which makes the obtained polymer unsuitable for certain applications, such as LLDPE for film applications.

The deactivation of the catalyst remaining in the reactor has previously been studied in detail. Examples of these studies are found in U.S. Pat. No. 6,949,612, US 20050059784, WO 2004060931, U.S. Pat. Nos. 5,747,612, 5,442,019, 5,672,665, 5,753,786. None of these prior art documents mention the effect of the trace amount of incompatible catalyst and the possibility of the catalyst remaining in the catalyst feeding system even after intensive purging.

U.S. Pat. No. 5,672,666 describes a process for transitioning from a Ziegler-Natta catalyst to a metallocene catalyst in which a deactivating agent is introduced to the reactor and the reactor is purged before the introduction of the metallocene catalyst. U.S. Pat. No. 5,672,666 mentions that substantially all of the activating and/or scavenging compounds, for example TEAL, are removed prior to the introduction of the metallocene catalyst. U.S. Pat. No. 5,672,666 further mentions that it is important that if a common catalyst feeder system is used it too be substantially free of any residual catalyst.

The present inventors surprisingly found that using a common catalyst feeder system cleaned by purging can only lead to a system which is substantially free of the residual catalyst which is satisfactory in terms of density and melt index, but not gel content. For transitioning to obtain polyethylene having also a desired low gel content, a catalyst feeder substantially free of residual catalyst achieved by purging is insufficient, but a catalyst feeder completely free of residual catalyst is required. Accordingly, the present invention provides the use of two separate catalyst feeders. U.S. Pat. No. 5,672,666 does not mention that separate catalyst feeders have to be used since the catalyst feeder must be completely free of residual catalyst and that a common catalyst feeder system made substantially free of residual catalyst e.g. by purging is insufficient.

The problem caused by the remaining first catalyst can also be avoided by physically cleaning the first catalyst feeding system. This allows the use of the first catalyst feeding system for the second catalyst feeding system. However, the physical cleaning of the catalyst feeding system typically takes 6-8 hours. Instead of the time consuming physical cleaning, two separate catalyst feeders are used for two incompatible catalysts in the process according to the invention.

The first catalyst may be fed as a dry catalyst and the second catalyst may be fed as a dry catalyst.

The first catalyst may be fed as a dry catalyst and the second catalyst may be fed as a suspension in a solvent.

The first catalyst may be fed as as a suspension in a solvent and the second catalyst may be fed as a dry catalyst.

The first catalyst may be fed as as a suspension in a solvent and the second catalyst may be fed as a suspension in a solvent.

In particular, the first catalyst may be a Ziegler-Natta catalyst and be fed as a suspension in a solvent and the second catalyst may be a metallocene catalyst and be fed as a dry catalyst.

In particular, the first catalyst may be a Ziegler-Natta catalyst and be fed as a dry catalyst and the second catalyst may be a metallocene catalyst and be fed as a dry catalyst.

For the purposes of this patent specification and appended claims the terms "catalysts" and "catalyst systems" are used interchangeably.

Polymerization

The first polymerization reaction and the second polymerization reaction may be a continuous polymerization of one or more α-olefin monomers of which at least one is ethylene or propylene. Preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

With 'continuous polymerization of one or more α-olefins' or 'continuous preparation of polyolefin' is meant herein that one or more α-olefin monomers of which at least one is ethylene or propylene are fed to the reactor and polyolefin thus produced is (semi)-continuously withdrawn through a polymer discharge system connected to the reactor.

The continuous polymerization of one or more α-olefin monomers will produce polyolefins in the form of particles, herein also referred to as 'polyolefin'. Examples of polyolefins which may be produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR).

Preferably, in the process of the invention, the polyolefin produced is a polyethylene, more preferably a linear low density polyethylene.

Fluidized Bed

The process of this invention can be used in any gas phase polymerization process in a gas phase reactor. The gas phase reactor may be any reactor suitable for gas phase polymerizations and may e.g. be vertically, horizontally mechanically agitated reactor or a fluidized bed reactor. A gas phase polymerization process in a fluidized bed reactor is preferred. In a typical continuous gas fluidized bed polymerization process for the production of polymer from monomer, a gaseous stream comprising monomer is passed through a fluidized bed reactor in the presence of a catalyst under reactive conditions.

Gas fluidized bed polymerization plants generally employ a continuous gas cycle. In one part of the cycle, in a reactor a cycling gas stream is heated by the heat of polymerization. This heat is removed in another part of the cycle by a cooling system external to the reactor. In one embodiment the cycle gas stream is cooled to form a gas and a liquid phase mixture that is then introduced into the reactor. A polymer product is withdrawn from the reactor. For a detailed description of a gas phase process see U.S. Pat. Nos. 4,543,399 and 4,588,790 herein fully incorporated by reference Using a fluidized bed polymerization process substantially reduces the energy requirements as compared to other polymerization processes and most importantly reduces the capital investment required to run such a polymerization process. In preferred embodiments, the fluidized bed is maintained in a fluidized condition during the process of this invention.

There are many types of fluidized bed reactors, among which a bubbling fluidized bed reactor, a circulating fluidized bed reactor, an annular fluidized bed reactor, a multi-zone fluidized bed reactor and a flash reactor.

The process according to the invention is preferably performed in a multi-zone fluidized bed reactor.

With 'fluidized bed' as used herein is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

An example of a process using a fluidized bed for producing polyolefins is disclosed in U.S. Pat. No. 4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987. The bottom of a fluidized bed reactor (FBR) can for example comprise an inlet connected to a feeder for the reaction composition such as ethylene, nitrogen (N2), hydrogen (H2), comonomer, tri-isobutylamine (TIBAL)-amine, and triethylaluminium (TEAL). The middle zone in the reactor above the distribution plate comprises an inlet for the polymerization catalyst that can be fed to the reactor in combination with nitrogen (N2). The middle zone of the reactor also comprises an outlet to the product discharge tank. The top zone of the reactor comprises an outlet for a top recycle stream, wherein the outlet for the top recycle stream is connected to an inlet of the compressor. The compressor comprises an outlet for compressed fluids and the outlet of the compressor is connected to an inlet for compressed fluids of the cooling unit. The cooling unit comprises an outlet for providing a bottom recycle stream, which outlet of the cooling unit is connected to the inlet at the bottom of the reactor.

An example of a multi-zone fluidized bed reactor (FBR) system is shown in FIG. 1. The multi-zone reactor of this example is a multi-zone reactor operable in condensed mode, which multi-zone reactor comprises a first zone, a second zone, a third zone, a fourth zone and a distribution plate,
wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor
wherein the largest diameter of the inner wall of the third zone is larger than the largest diameter of the inner wall of the second zone.

The FBR of this example can operate in a so-called "condensing mode" or "condensed mode" which is effective for removal of the heat produced during the exothermic polymerization. In this mode, heat removal is achieved by cooling the gaseous recycle stream to a temperature below its dew point, resulting in the condensation of at least a part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor and enables feeding of one or more very highly active catalysts. Details of the FBR which operates in a condensing mode are further described in Application no. EP 13195141.0, incorporated herein by reference.

BRIEF DESCRIPTION OF THE FIGURE

The figure illustrates an FBR system comprising a multi-zone reactor (8), a compressor (400) and a cooling unit (5).

The multi-zone reactor (8) of this example is extended in the vertical direction and comprises four reaction zones (1), (2), (3) and (4). Zone (4) can preferably be located above zone (3), zone (3) can be located above zone (2) and zone (2) can located above zone (1) in the vertical direction toward the top of the reactor.

The first zone (1) comprises a first inlet for receiving a bottom recycle stream (10) and the first zone (1) is separated from the second zone (2) by a distribution plate (6). The second zone (2) comprises a first inlet for receiving a solid polymerization catalyst (20). The third zone (3) comprises a first outlet for providing polyolefin (30). This outlet can also be located in the second zone (2). At least one of the second zone (2) or the third zone (3) can comprise at least one section where the inner wall of the reactor is either in the form of a gradually increasing inner diameter or a continuously opening cone in the vertical direction towards the top of the reactor. Here both the second zone (2) and the third zone (3) comprise such sections designated respectively by 2A and 3A. In the second zone (2), at least one section where the inner wall of the reactor is either in the form of a gradually increasing inner diameter or a continuously opening cone in the vertical direction towards the top of the reactor (2A) can preferably be located immediately above the distribution plate (6). Immediately above the distribution plate (6) can thereby preferably mean so that pooling of liquid can be reduced or avoided. Moreover, at least one of the second zone (2) or the third zone (3) can comprise at least one section where the inner wall of the reactor is either in the form of a cylinder. Here both the second zone (2) and the third zone (3) comprise such sections designated respectively by 2B and 3B. The fourth zone (4) comprises a first outlet for a top recycle stream (40) which is connected to a first inlet of the compressor (400) via a first connection means (AA). The fourth zone is thereby a disengagement zone, which may be designed so that polymer particles preferably do not reach that zone or do not stay as little as possible in that zone but rather return to the third zone (3) or the second zone (2), especially for example to allow avoiding the clogging of the compressor (400). The connection means (AA) comprise a first inlet for receiving a feed (60).

The compressor (400) comprises a first outlet for compressed fluids (50) which is connected to a first inlet for compressed fluids of the cooling unit (5) via a second connection means (BB). The second connection means (BB) comprise an inlet for receiving a feed (70). The cooling unit (5) comprises a first outlet for providing the bottom recycle stream (10) which is connected to the first inlet of the first zone (1).

The FBR system may further comprise a polymer withdrawal system, a polymer degassing system and a vent gas recovery system (not shown in FIG. 1). The outlet for the recovered components (in liquid form) (80) from the vent gas recovery system may be transported to the first inlet (70) of the second connection means (BB) by means of pump (7).

This system can suitably be used for a process for continuous polymerization comprising
supplying the second zone (2) with a solid polymerization catalyst using the first inlet for receiving the solid polymerization catalyst (20)
supplying a feed (60) comprising an α-olefin monomer to the first connection means (AA)
optionally supplying a feed (70) comprising condensable inert components to the second connection means (BB)
withdrawing the polyolefin (30) using the first outlet of the second zone (2) and/or the third zone (3) and circulating fluids from the first outlet of the fourth zone (4) to the first inlet of the first zone
wherein the fluids are circulated by
compressing the feed (60) and the top recycle stream (40) using the compressor (400) to form the compressed fluids (50)
subsequently cooling the compressed fluids (50) using the cooling unit (5) to below the dew point of the compressed fluids to form the bottom recycle stream (10) and
feeding the bottom recycle stream (10) to the first zone of the multi-zone reactor (8) via the inlet for receiving the bottom recycle stream of the first zone, and
wherein the superficial gas velocity in this process is in the range of 0.5 to 5 m/s.

The feed (60) comprises a chain transfer agent, for example hydrogen and may further comprise gaseous α-olefin monomers and insert gaseous components, for example nitrogen.

The feed (70) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neopentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

The above FBR system has the advantage that introduction of higher amounts of liquid is allowed without causing destabilization of the fluidized bed.

Catalysts

While in the preferred embodiment the process of the invention specifically addresses transitioning between a traditional Ziegler-Natta catalyst and a metallocene catalyst, it is within the scope of this invention that the process of the invention would apply to any transition between incompatible catalysts. For example, transitioning between a traditional Ziegler-Natta catalyst and a chromium catalyst or transitioning between a chromium catalyst and a metallocene catalyst or even transitioning between a traditional Ziegler-Natta titanium catalyst to a Ziegler-Natta vanadium catalyst. This invention contemplates that the direction of transitioning between incompatible catalysts is not limiting, however, it is preferred that the process of the invention transition from any other catalyst incompatible with a metallocene catalyst.

Traditional Ziegler-Natta catalysts typically in the art comprise a transition metal halide, such as titanium or vanadium halide, and an organometallic compound of a metal of Group 1, 2 or 3, typically trialkylaluminum compounds, which serve as an activator for the transition metal halide. Some Ziegler-Natta catalyst systems incorporate an internal electron donor which is complexed to the alkyl aluminum or the transition metal. The transition metal halide may be supported on a magnesium halide or complexed thereto. This active Ziegler-Natta catalyst may also be impregnated onto an inorganic support such as silica or alumina. For the purposes of this patent specification chromocene catalysts, for example, described in U.S. Pat. No. 4,460,755, which is incorporated herein by reference, are also considered to be traditional Ziegler-Natta catalysts. For more details on traditional Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, 5,070,055 all of which are herein incorporated by reference.

The metallocene catalyst is preferably a metallocene catalyst of the general formula I below

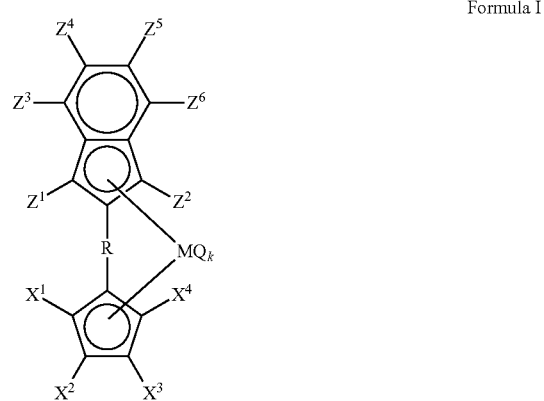

Formula I wherein:

M is a transition metal selected from the group consisting of lanthanides and metals from group 3, 4, 5 or 6 of the Periodic System of Elements; M is preferably selected from the group consisting of Ti, Zr and Hf with Zr being most preferred.

Q is an anionic ligand to M, k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

In another preferred embodiment the metallocene catalyst is of the general formula II below

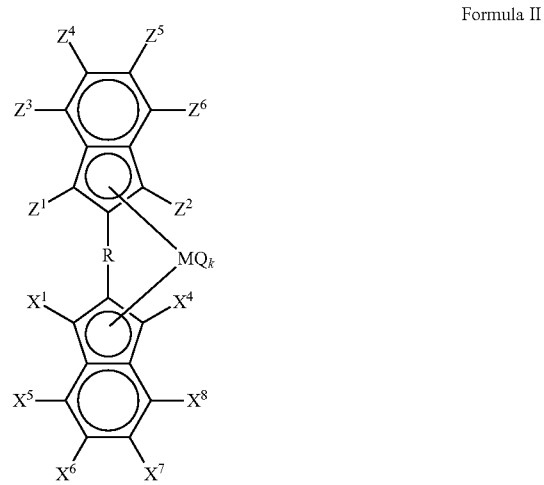

Formula II wherein:

M is a transition metal selected from the group consisting of lanthanides and metals from group 3, 4, 5 or 6 of the Periodic System of Elements; M is preferably selected from the group consisting of Ti, Zr and Hf with Zr being most preferred.

Q is an anionic ligand to M, k represents the number of anionic ligands Q and equals the valence of M minus two divided by the valence of the anionic Q ligand R is a hydrocarbon bridging group, such as alkyl. R preferably contains at least one sp2-hybridised carbon atom that is bonded to the indenyl group at the 2-position.

Z and X are substituents.

Bridging group R in the metallocene catalysts of general formula's I and II above preferably contains at least one aryl group. For example, the aryl group may be a monoaryl group such as phenylene or naphthalene or a biaryl group, such as biphenylidene or binaphthyl. Preferably the bridging group R stands for an aryl group, preferably R stands for a phenylene or biphenylidene group. The bridging group R is connected to the indenyl groups via a sp2 hybridised carbon atom, for example a phenylene group may be connected via the 1 and the 2 position, a biphenylene group may be connected via the 2 and 2'-position, a naphthalene group may be connected via the 2 and 3-position, a binapthyl group may be connected via the 2 and 2'-position. Preferably R stands for a phenylene group that is connected to the indenyl groups via the 1 and the 2 position. R may be 2,2'-biphenylene.

The substituents X in formulas I and II above may each separately be hydrogen or a hydrocarbon group with 1-20 carbon atoms (e.g. alkyl, aryl, aryl alkyl). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other substituents are halides, such as chloride, bromide, fluoride and iodide, methoxy, ethoxy and phenoxy. Also, two adjacent hydrocarbon radicals may be connected with each other in a ring system. X may also be a substituent which instead of or in addition to carbon and/or hydrogen may comprise one or more heteroatoms from group 14, 15 or 16 of the Periodic System of Elements. Examples of such a heteroatom containing substituents are alkylsulphides (like MeS—, PhS—, n-butyl-S—), amines (like Me2N—, n-butyl-N—), Si or B containing groups (like Me3Si— or Et2B—) or P-containing groups (like Me2P— or Ph2P—). Preferably the X substituents are hydrogen.

The substituents Z in formulas I and II above may each separately be a substituent as defined above for substituent X. Z1 and Z2 substituents can together with the X1 and X4 substituents form a second bridge that connects the indenyl group with the cyclopentadienyl group in the indenyl compound.

Examples of metallocene catalysts for use in the present invention are [ortho-bis(4-phenyl-2-indenyl)-benzene]zirconiumdichloride, [ortho-bis(5-phenyl-2-indenyl)-benzene]zirconiumdichloride, [ortho-bis(2-indenyl)benzene]zirconiumdichloride, [ortho-bis(2-indenyl)benzene]hafniumdichloride, [ortho-bis(1-methyl-2-indenyl)-benzene]zirconiumdichloride, [2.2'-(1.2-phenyldiyl)-1.1'-dimethylsilyl-bis(indene)]zirconiumdichloride, [2,2'-(1,2-phenyldiyl)-1, bis(indene)]zirconiumdichloride, [2,2'-(1.2-phenyldiyl)-1.1'-(1.2-ethanediyl)-bis(indene)]zirconiumdichloride, [2.2'-bis(2-indenyl) biphenypirconiumdichloride and [2,2'-bis(2-indenyl) biphenyl]hafniumdichloride.

The metallocene catalyst preferably contains zirconium as metal group M. The zirconium amount in the catalyst composition is preferably in the range of 0.02-1 wt %, preferably 0.15-0.30 wt % based on the catalyst composition.

The metallocene catalyst may be supported on a support, optionally with a catalyst activator and optionally a modifier. The second catalyst is preferably a metallocene catalyst composition comprising a support containing a metallocene catalyst, a catalyst activator and a modifier described in EP2610269, incorporated herein by reference. Such catalyst composition has an advantage that reactor fouling is reduced. It was observed that such catalyst composition was particularly sensitive to the gelling problem when common catalyst feeder was used.

The term "catalyst activator" as used herein is to be understood as any compound which can activate the single-site catalyst so that it is capable of polymerisation of monomers, in particular olefins. Preferably the catalyst activator is an alumoxane, a perfluorophenylborane and/or a perfluorophenylborate, preferably alumoxane, more preferably methylaluminoxane and/or modified methylaluminoxane.

The support in the catalyst composition of the present invention can be an organic or inorganic material and is preferably porous. Examples of organic material are cross-linked or functionalized polystyrene, PVC, cross-linked polyethylene. Examples of inorganic material are silica, alumina, silica-alumina, inorganic chlorides such as $MgCl_2$, talc and zeolite. Mixtures of two or more of these supports may be used. The preferred particle size of the support is from 1 to 120 micrometres, preferably of from 20 to 80 micrometres and the preferred average particle size is from 40 to 50 micrometres. The preferred support is silica. The pore volume of the support is preferably of from 0.5 to 3 $cm^3/g$. The preferred surface area of the support material is in the range of from 50 to 500 $m^2/g$. The silica used in this invention is preferably dehydrated prior to being used to prepare the catalyst composition.

Preferably, the modifier is the reaction product of an aluminum compound of general formula (1)

(1)

and an amine compound of general formula (2)

(2)

wherein

R1 is hydrogen or a branched or straight, substituted or unsubstituted hydrocarbon group having 1-30 carbon atoms, R2 and R3 are the same or different and selected from branched or straight, substituted or unsubstituted hydrocarbon groups having 1-30 carbon atoms and R4 is hydrogen or a functional group with at least one active hydrogen R5 is hydrogen or a branched, straight or cyclic, substituted or unsubstituted hydrocarbon group having 1-30 carbon atoms, R6 is a branched, straight or cyclic, substituted or unsubstituted hydrocarbon group having 1-30 carbon atoms.

In a preferred embodiment of the invention the amounts of aluminum compound and amine compound are selected such that in the modifier the molar ratio of Al to N is in the range of 1:3 to 5:1, preferably 1:2 to 3:1, more preferably 1:1.5 to 1.5:1. Within this range a good combination of technical effects of the present invention can be obtained. If the molar ratio of Al to N is below 1:3 then fouling and/or sheeting may occur, whereas if the molar ratio of Al to N is above 5:1 catalyst productivity decreases, i.e. the amount of polymer produced per gram of catalyst decreases. The most preferred molar ratio is 1:1.

In the compound of general formula (2), R4 is a hydrogen or a functional group with at least one active hydrogen, R5 is hydrogen or a branched, straight or cyclic, substituted or unsubstituted hydrocarbon group having 1-30 carbon atoms, R6 is a branched, straight or cyclic, substituted or unsubstituted hydrocarbon group having 1-30 carbon atoms (carbon atoms of the substituents included). The branched, straight or cyclic, substituted or unsubstituted hydrocarbon group having 1-30 carbon atoms is preferably an alkyl group having 1-30 carbon atoms, for example an alkyl group having 1-30 carbon atoms, for example a straight, branched or cyclic alkyl, an aralkyl group having 1-30 carbon atoms or an alkaryl group having 1-30 carbon atoms.

The amine compound used in the reaction to prepare the modifier may be a single amine compound or a mixture of two or more different amine compounds.

The amine compound used for preparing the modifier of the present invention preferably has a hydrocarbon group of at least eight carbon atoms, more preferably at least twelve carbon atoms, for example an alkyl group of 1 to fifteen carbon atoms. The amine compound may be a primary, secondary or tertiary amine. The amine compound is preferably a primary amine.

In an embodiment of the present invention the amine compound is selected from the group consisting of octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

The aluminum compound used in the reaction to prepare the modifier may be a single aluminum compound or a mixture of two or more different aluminum compounds. R1, R2 and R3 may each independently stand for a branched or straight, substituted or unsubstituted hydrocarbon group having 1-30 carbon atoms, for example may each independently stand for an alkyl, preferably R1, R2 and R3 all stand for an alkyl, more preferably R1, R2 and R3 are the same.

The aluminum compound of the present invention is preferably a trialkylaluminum (R1=R2=R3=alkyl or a dialkylaluminumhydride (R1=hydrogen, R2=R3=alkyl). In an embodiment of the present invention the aluminum compound is selected from the group consisting of of tri-methylaluminum, tri-ethylaluminum, tri-propylaluminum, tri-butylaluminum, tri-isopropylaluminum tri-isobutylaluminum, or di-methylaluminumhydride, di-ethylaluminumhydride, di-propylaluminumhydride, di-butylaluminumhydride, di-isopropylaluminumhydride, di-isobutylaluminumhydride. These materials are readily available and have good reactivity with amines. An alkyl as used herein will be understood by the skilled person as meaning a hydrocarbon group that contains only carbon and hydrogen atoms and is derived from alkanes such as methane, ethane, propane, butane, pentane, hexane etc. The alkyl may be branched, straight or cyclic. Preferably R1, R2 and R3 may each independently stand for a straight or branched alkyl.

In a preferred embodiment the aluminum compound is a trialkylaluminum and the amine compound is a primary amine, preferably the amine compound is selected from the group consisting of octadecylamine, ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

Preferably, the modifier is the reaction product of cyclohexylamine and tri-isobutylaluminum.

In some embodiments, the modifier is an amine compound of general formula (3)

where R7 is hydrogen or a linear or branched alkyl group of from 1 to 50 carbon atoms;
R8 is a hydroxy group of a $(CH_2)_x$ radical and where x is an integer from 1 to 50. An example of these surface modifiers includes commercially available Atmer 163. It was observed that such catalyst composition was particularly sensitive to the gelling problem when common catalyst feeder was used.

The surface modifier may be selected from at least one of the group of compounds represented by the following chemical formula: $C_{18}H_{37}N(CH_2CH_2OH)_2$, $C_{12}H_{25}N(CH_2CH_2OH)_2$ and $(CH_3(CH_2)_7(CH)_2(CH_2)_7OCOCH_2(CHOH)_4CH_2OH$. The surface modifier may be a sorbital monooleate compound or a tertiary ethoxylated amine.

Step (a)

Step (a) is preferably performed in such a way that the ratio between the first catalyst and a co-catalyst of the first catalyst is maintained. Step (a) may generally be performed by decreasing the amount of the first catalyst and its co-catalyst over a period of 1-4 hours.

After the introduction of the first catalyst and its co-catalyst is stopped, the reactor gas composition for the first polymerization is preferably maintained for a period of time, e.g. 1-4 hours. This allows the consumption of the co-catalyst and gradual reduction in the production rate.

Conventionally, gas phase polymerization processes typically run continuously, therefore the temperature of the fluidized bed reactor is controlled to an essentially isothermal level through continuously removing the heat of polymerization by circulating the gas exiting from the fluidized bed to a condenser/heat exchanger outside the reactor and recirculating the cooled gas stream back into the reactor. When the temperature of the recirculating stream introduced or recycled into the fluidized bed polymerization reactor is above the dew point temperature, substantially no liquid is present. This process is known as the "dry mode" process. One method to maximize the ability of heat removal is, throughout the operation, to reduce to the lowest possible value the temperature of the gaseous feed stream into the reactor.

According to the "condensed mode" process a two phase mixture comprising liquid and gas is used into the fluidized bed as a fluidizing medium, the liquid portion of which vaporizes when it is exposed to the heat of the reactor. Fluid can be formed by cooling the recycle stream withdrawn from the reactor below the dew point temperature, thereby converting a portion of the gas into a liquid, and the cooled recycle stream can then be reintroduced into the fluidized bed polymerization reactor. The objective here is to take advantage of the cooling effect brought about by the vaporization, i.e., by bringing the temperature of the fluidized bed down to a point where degradation of the polymer and the catalyst can be avoided and agglomeration of the polymer and chunking can be prevented. The liquid phase/portion is provided by a portion of the recycle gases, which includes monomers and low boiling liquid hydrocarbons, inert to the reaction conditions needed for polymerization, and condensation. Condensed mode fluidized bed reactor polymerization processes are disclosed in for example in U.S. Pat. Nos. 4,543,399 and 4,588,790. These publications describe the introduction of an inert liquid into the recycle stream to increase the dew point temperature of the recycle stream and allow the process to operate at levels of up to 17.4% liquid by weight, based on the total weight of the cooled recycle stream. A condensed mode process is advantageous because its ability to remove greater quantities of heat generated by polymerization increases the polymer production capacity of a fluidized bed polymerization reactor. A common liquid hydrocarbon used in the liquid phase/portion is isopentane, which boils at about 27° C., and consequently becomes a vapor in the recycle line in view of the heat present in the recycle gases. The recycle gases leave the reactor, are cooled, and then condensed to the extent that a vapor phase/portion and liquid phase/portion are formed. The velocity of the recycled gas/liquid mixture should be sufficient to support the fluidized bed, but slow enough to avoid excessive entrainment of fines. The cooling capacity should be sufficient to improve the production rate in terms of space/time/yield.

"Super condensed mode" fluidized bed reactor polymerization processes operate with above 17.4% liquid by weight in the cooled recycle stream as described for example in U.S. Pat. No. 5,352,749. These must be confined under certain more specific and restrictive conditions within a limited and known range of operating conditions to avoid destabilizing the fluidized bed, thereby halting the process.

In the cases where the first polymerization process is operated in a condensed mode or a supercondensed mode, then a process transitioning is performed from the condensed mode or the supercondensed mode to the 'dry mode'. This can also be done in step (a) and/or thus preferably for example before step (b).

Moreover, the fluidized bed reactor may be subjected to a "mini-kill" or a "partial-kill" in which a reversible catalyst killer, preferably CO, is introduced to render the first catalyst inactive, or in other words, incapable of polymerization (even temporary), for example in step (a). Reversible catalyst killer may thereby mean that in absence and/or very low concentrations (for example below 0.1 ppm) of the reversible catalyst killer and/or after a certain time the activity of the catalyst can be restored. This can allow a fast process transitioning from condensed mode to dry mode. Typically, the reversible catalyst killer, especially for example CO, may injected to the reactor, where its concentrations inside the reactor does for example not exceed 20 ppm of the cycle gas flow composition. Preferably the concentration of the reversible catalyst killer inside the reactor can be for example from 0.1 to 10 ppm, preferably from 0.1 to 5 ppm, more preferably from 0.1 to 3 ppm.

After the introduction of the desired amount of reversible catalyst killer, especially for example CO to the reactor, the reactor can be kept on hold for a short period to ensure the "partial kill". At least one reversible catalyst killer can thereby be used for example before, after or together with at least one irreversible catalyst killer. Preferably, at least one reversible catalyst killer can be used (for example in step (a)) before an irreversible catalyst killer, such as especially for example cyclohexylamine, is used (for example in step (b)).

Subsequently, product withdrawal can be stopped and/or the polymer discharge system is separated from the product purge bin and the vent recovery system, preferably in step (a) and/or thus preferably for example before step (b).

There are various techniques and systems for removing volatile hydrocarbons from polymers. See, for example, U.S. Pat. Nos. 4,197,399, 3,594,356, and 3,450,183, in which a columnar (or straight cylindrical) vessel is used as a purger, referred to as a polymer purge bin, or product purge bin. U.S. Pat. No. 4,372,758 discloses a degassing or purging process for removing hydrocarbons, such as alkenes, from solid olefin polymers. These techniques and systems can be used for/as product purge bin to remove volatile hydrocarbons from polymers. The purging process generally comprises conveying the solid polymer (e.g., in granular form) to a polymer purge bin and contacting the polymer in the purge bin with a countercurrent gas purge stream to strip away the hydrocarbon gases which are evolved from the polymer. Most commonly, the whole purging is done with an inert gas such as nitrogen. However, it is also possible to use a light hydrocarbon rich gas to strip the heavier hydrocarbons in a first stage and then use an inert gas in a second stage for the comparatively easy task of stripping the light hydrocarbons that remain in and around the resin after the first stage.

A vent recovery system is typically utilized to recover hydrocarbons from the mixed hydrocarbon/inert purge gas stream exiting the purge vessel. Existing methods of recovering hydrocarbons from the polymerization unit vent stream include for example: a) compression and condensation with water and/or mechanical refrigeration (for example cooling to −10° C.); and b) separation via pressure swing absorption (PSA) or membranes. In existing gas phase polyethylene plants, Option (a) is most commonly applied, but a combination of (a) and (b) has also been used.

In a compression and condensation system, such as described in U.S. Pat. No. 5,391,656, a polymer purge bin vent stream, which contains inert gases, such as nitrogen, and various monomers, is treated in a series of steps that include: cooling to condense a portion of the reactor gas stream; separating the condensed liquids from the remaining non-condensable gases; compressing the non-condensable gases; cooling the compressed stream to promote further condensing, further liquid/gas separation, and further recycle of condensed monomers. The compression and cooling vent recovery system provide recovery of a high percentage of the heavier contained hydrocarbons, for example butene, isopentane, hexene, hexane, and other heavy alkenes and alkanes, through the condensation process.

Another recovery method contemplated in the art involves cryogenic vent recovery, wherein condensation of monomer from vent streams containing nitrogen is accomplished by vaporization of liquid nitrogen. Commercially available cryogenic vent recovery systems used for cryogenic vent recovery typically rely on importing liquid nitrogen from another facility at site, importing liquid nitrogen from an off-site facility, or sending the vent to an off site facility to recover the condensable hydrocarbons as a refuse stream.

Polymerization processes that utilize only compression/condensation with non-cryogenic cooling of vent gas for hydrocarbon recovery can recover most of the C4 and heavier hydrocarbons but will typically recover only about 0 to 50% of the vented ethylene. Furthermore, the uncondensed nitrogen contains significant amounts of heavy hydrocarbons, which may preclude using it as a resin drying or purge gas. To reach a higher ethylene recovery and achieve a higher recovered gas quality, further vent recovery processing is required.

U.S. Pat. No. 6,576,043 describes a process for the separation of a gas mixture comprising nitrogen and at least one hydrocarbon from a polyethylene or polypropylene production plant in which nitrogen is utilized to purge solid particles of polymer product. The gas mixture is separated in an adsorbent bed by a Pressure Swing Adsorption (PSA) process U.S. Pat. No. 6,706,857 describes a process for the production of a polyolefin, wherein an olefin monomer is polymerized and a residual monomer is recovered from a gas stream comprising the monomer and nitrogen. This process also uses a PSA process in which the monomer is adsorbed on a periodically regenerated silica gel or alumina adsorbent to recover a purified gas stream containing the olefin and a nitrogen rich stream.

U.S. Pat. No. 5,769,927 describes a process for treating a purge vent stream from a polymer manufacturing operation, the vent stream containing an olefin, such as ethylene or propylene, and a purge gas, such as nitrogen. The invention involves condensation, flash evaporation, and membrane separation. The process compresses and cools the purge vent stream; flashes a condensed portion to partially remove amounts of purge gas; treats the uncondensed portion in a membrane separation unit; and recirculates the flash stream and a mixed stream from the membrane to the condensation step.

U.S. Pat. No. 5,741,350 discloses a method and apparatus for recovery of hydrocarbons from polyalkene product purge gas that yields an alkene monomer recycled to the polymerization process and a vapor-rich inert gas. The alkene monomer is condensed and separated at low temperature from the inert gas, flashed and vaporized to provide refrigeration for the condensation step, and recycled to the polymerization process.

Other background references in this respect include U.S. Pat. Nos. 4,188,793, 4,727,723, 5,035,732, 5,421,167, 5,497,626, 5,626,034, 5,979,177, 6,560,989, 6,576,805, 6,712,880, and 7,128,827, and U.S. Patent Application Publication Nos. 2005/0229634 and 2005/0159122.

Step (b)

In step (b), to substantially terminate these polymerization reactions within the reactor, polymerization inhibitors or "catalyst killers", preferably comprising at least one irreversible catalyst killer, are employed. For the purposes of this patent specification, the catalyst killers do not include that minor portion of catalyst killers that may be contained in the monomer or comonomer feed streams during normal polymerization conditions (for example, internal olefins). Cyclohexylamine can be used as irreversible catalyst killer. Cyclohexylamine can thus be introduced to at least partly deactivate the first catalyst. The term 'at least partly deactivate' is herein understood to mean that the catalyst productivity is decreased by at least 80%, preferably at least 90%. Preferably, the catalyst productivity is decreased by about 100%, i.e. the catalyst is deactivated.

There are two general types of polymerization inhibitors. First, reversible catalyst killers which may be used in the invention are those such as, but not limited to, for example, carbon monoxide (CO), carbon dioxide (CO2), internal olefins, 2-butene and the like, internal dienes, 2-4 hexadiene and the like, alkenes and butadienes. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue. Two or more irreversible catalyst killers can also be used in combination. These reversible catalyst killers can be used in any combination or order of introduction in the process of this invention.

Second, there are irreversible catalyst killers, those killers that irreversibly inactivate a catalyst's ability to polymerize olefins. According to the invention, cyclohexylamine is used as the irreversible catalyst killer.

In some embodiments of the invention, only cyclohexylamine is used as the irreversible catalyst killer.

In some embodiments of the invention, one or more known further irreversible catalyst killer can be used, e.g. oxygen, water ($H_2O$), alcohols, glycols, phenols, ethers, carbonyl compounds such as ketones, aldehydes, carboxylic acids, esters, fatty acids, alkynes such as acetylene, nitriles, nitrous compounds, pyridine, pyroles, carbonylsulfide (COS) and mercaptans. Amines other than cyclohexylamine may also be used as the additional irreversible catalyst killer. The amine compounds used as irreversible catalyst killers in the present invention may preferably be an amine comprising a hydrocarbon group with at least eight carbon atoms, more preferably with at least twelve carbon atoms. An amine compound used as irreversible catalyst killer can thereby preferably be a primary amine. Two or more irreversible catalyst killers can thereby also be used in combination.

In an embodiment of the present invention an amine compound used as irreversible catalyst killer is selected from the group consisting of octadecylamine, ethylhexylamine, 2-ethylhexylamine, cyclohexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil.

These irreversible catalyst killers can be used in any combination or order of introduction in the process of this invention.

At least one irreversible catalyst killer, especially for example cyclohexalamine, can also be used with one or more other irreversible catalyst killers and/or one or more reversible catalyst killers, especially for example in step (b) according to the present invention.

It is thus not beyond the scope of this invention that a mixture of one or more of these reversible and irreversible catalyst killers can be combined before introduction into a reactor, however, one of ordinary skill in the art will recognize that some of these killers could react with each other and are thus better introduced separately.

Preferably, once the first incompatible catalyst feed has been interrupted, a reversible catalyst killer is introduced into the reactor for a period of time sufficient to substantially deactivate the catalyst in the reactor and thus, substantially preventing further polymerization from occurring. This can be done for example in step (a) or in step (b). The use of the reversible catalyst killer decreases the likelihood of sheeting and/or fouling occurring in the reactor where the process of the invention takes place within the reactor in which polymerization was occurring with the first catalyst. In embodiment of the invention, prior to introducing an irreversible catalyst killer, the first catalyst can be rendered substantially inactive, or in other words, substantially incapable of polymerization by the introduction/use of a reversible catalyst killer. The preferred reversible catalyst killers of the invention are CO and/or $CO_2$. The amount of reversible catalyst killer used depends on the size of the reactor and the quantity and type of catalysts and cocatalysts in the reactor. Preferably, the reversible catalyst killer of the invention can be used for example in an amount based on the total gram atoms of the catalyst transition metal components. However, where any activator or cocatalyst is used with the first catalyst, and such activator or cocatalyst is capable of reacting with the second catalyst, the reversible catalyst killer can be used for example in an amount based on the total gram atoms of catalyst transition metal components and any activator.

In some embodiments the reversible killer is used in amount greater than 1 molar equivalent, preferably greater than 2 molar equivalents based on the total gram atoms transition metal of the catalyst in the reactor.

In some embodiments once the reversible catalyst killer has been introduced into the reactor, a period of time of about 5 minutes to 24 hours, preferably 1 to 12 hours, more preferably 1 to 6 hours and most preferably 1 to 2 hours passes before introducing an irreversible catalyst killer. Letting this time pass is meant by putting the reactor "on hold". The duration can depend on the nature and amount of catalyst and volume of the reactor. In a gas phase reactor there is a seed bed that is typically very large in size and quantity of polymer. Thus, a sufficient period of time is needed to allow the reversible catalyst killer to disperse throughout the reactor, particularly throughout any polymer product within the reactor.

Once the reversible catalyst killer has been introduced into the reactor, in a preferred embodiment, an irreversible catalyst killer is introduced into the reactor. As described above, cyclohexylamine is used as the irreversible catalyst killer.

In a preferred embodiment the amount of irreversible catalyst killer introduced into the reactor is in the range of 0.1 to 1000 molar ratio of irreversible catalyst killer to the total metal of the catalyst and any activator in the reactor, preferably 0.1 to 100, more preferably about 1 to about 10, even more preferably about 1 to about 5 and most preferably greater than about 1 to less than about 2. However, where any activator or cocatalyst is used with the first catalyst, and such activator or cocatalyst is capable of reacting with the second catalyst, the irreversible catalyst killer can be used in an amount based on the total gram atoms of catalyst transition metal components and any activator. In another embodiment, the irreversible catalyst killer can be used in an amount in the range of 100% to 125% of that necessary to fully inactivate all of the active first catalyst. This allows to substantially deactivate the first catalyst (so that it can also preferably not reactive itself) before introducing a second incompatible. This also to avoid an excess amount of irreversible killer that could remain in the reactor and partially or totally deactivate the second incompatible catalyst upon its injection into the reactor.

As mentioned above, the amount of the irreversible catalyst killer to be added may be determined based on the measurement of the static of the reactor.

In yet another embodiment once the irreversible catalyst killer has been introduced into the reactor a period of time of about 5 minutes to about 24 hours, preferably about 1 hour to about 12 hours, more preferably about 1 hour to 6 hours and most preferably about 1 hour to 2 hours passes before continuing the transitioning process. Again, the duration of exposure is for the same reasons stated for the reversible catalyst killer.

Step (b2)

Typically, in the process of the invention it is important to substantially free the reactor of impurities, particularly the irreversible catalyst killer, which can render the second catalyst inactive upon its introduction into a reactor. Thus, an organometallic compound may be introduced into the reactor in step (b2) which is capable of reacting with cyclohexylamine.

The organometallic compound reacts with the irreversible catalyst killer, such as cyclohexylamine. Such organometallic compounds can include for example, $BX_3$ where X is a halogen, $R^1R^2Mg$, ethyl magnesium, $R^4CORMg$, RCNR, $ZnR_2$, $CdR_2$, LiR, SnR4 where R are hydrocarbon groups that could be the same or different.

The organometallic compounds useful are those compounds of Group 1, 2, 3 and 4 organometallic alkyls, alkoxides, and halides. The preferred organometallic compounds are lithium alkyls, magnesium or zinc alkyls, magnesium alkyl halides, aluminum alkyls, silicon alkyl, silicon alkoxides and silicon alkyl halides. The more preferred organometallic compounds are aluminum alkyls and magnesium alkyls.

The most preferred organometallic compounds are the aluminum compound of formula (1) as described above. The organometallic compounds used in step c) may be same or different from the aluminum compound of formula (1) used for the preparation of the surface modifier as described above.

The organometallic compound reacts with the remaining catalyst killer such as cyclohexylamine, which reactant is circulated in the reactor for a period of time before the second catalyst is introduced. The reactant acts as a continuity aid agent, which assists in reducing fouling and/or sheeting on the walls of the reactor and/or reactor components.

Step (b3)

During the polymerization with the first incompatible catalyst, gases accumulate within the reactor, which originate from the electron donor when the first catalyst is especially a Ziegler-Natta catalyst. These gases are typically poisonous to the first catalyst, particularly to the second incompatible catalyst. These gases for a traditional Ziegler-Natta catalyst include, for example, tetrahydrofuran (THF), ethanol, ethyl benzoate and the like. Also, the introduction of the reversible and irreversible catalyst killers also produce by-products that can be detrimental to any polymerization process.

Thus, before introducing the second incompatible catalyst the reactor contents are subjected to what is known in the art as pressure purging. Typically the procedure is used in handling any air/moisture sensitive materials to remove, purge, or reduce in the process of the invention, for example, the catalyst killers and by-products thereof and reactants to a lower level.

Once this procedure is complete the gas composition in the reactor system is adjusted for the second catalyst. Hence, a gas composition for the second polymerization reaction is introduced in the reactor in step (b3). For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2-15 carbon atoms, for example, alpha-olefin of ethylene, propylene, butene-1, pentene-1, 4-methylpentene-1, hexene-1, octene-1, decene-1 and cyclic olefins such as styrene. Other monomers can include polar vinyl, dienes, norborene, acetylene and aldehyde monomers. In the preferred embodiment, the gas composition contains ethylene and at least one alpha-olefin having 3 to 15 carbon atoms.

Typically, the gas composition also contains an amount of hydrogen to control the melt index of the polymer to be produced. In typical circumstances the gas also contains an amount of dew point increasing component with the balance of the gas composition made up of a non-condensable inerts, for example, nitrogen.

Depending on the second catalyst to be introduced into the reactor the gas composition, such as the comonomer and hydrogen gas concentrations, can be increased or decreased. In the preferred embodiment the gas composition is decreased, particularly when a metallocene catalyst is utilized as the second catalyst in the process of the invention.

Typically, the reactant gas composition is diluted as above, for example, by either pressure purging or flow purging procedures well known in the art. During this step, as discussed above, impurities such as electron donors from the catalyst are also removed.

Step (b4)

Preferably, after step (b3) and before step (c), a continuity aid agent is introduced. The continuity aid agent may be the same or different as the modifier as described above and is the reaction product of an aluminum compound of general formula (1)

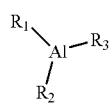

(1)

and an amine compound of general formula (2)

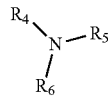

(2)

wherein
R1 is hydrogen or a branched or straight, substituted or unsubstituted hydrocarbon group having 1-30 carbon atoms,
R2 and R3 are the same or different and selected from branched or straight, substituted or unsubstituted hydrocarbon groups having 1-30 carbon atoms and
R4 is hydrogen or a functional group with at least one active hydrogen
R5 is hydrogen or a branched, straight or cyclic, substituted or unsubstituted hydrocarbon group having 1-30 carbon atoms,
R6 is a branched, straight or cyclic, substituted or unsubstituted hydrocarbon group having 1-30 carbon atoms.

The continuity aid agent is added to the reactor as a further process aid for reducing fouling and or sheeting. The amount is generally in the order of 0.01-0.1 mmol per gram of catalyst composition.

Particularly preferred as the continuity aid agent is the reaction product of tri-isobutylaluminum and octadecylamine.

Step (c)

Subsequently, the second catalyst is introduced into the reactor under reactive conditions. The second polymerization reaction is started. The first catalyst is introduced from a first catalyst feeding system and the second catalyst is introduced from a second catalyst feeding system separate from the first catalyst feeding system. This prevents the risk of a trace amount of the first catalyst remaining in the catalyst feeding system leading to the formation of unacceptable amount of gel, without the time-consuming physical cleaning of the catalyst feeding system. The physical cleaning of the catalyst feeding system typically takes 6-8 hours.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

The gas phase reactor system as schematically shown in FIG. 1 was used for the transition process. The gaseous feed streams are mixed together in a mixing tee arrangement and enters the reactor from the bottom, and passes through a perforated distribution plate. The unreacted gas stream is separated from the entrained polymer particles, and is then compressed, cooled, and recycled back into the reactor. Product properties are controlled by adjusting reaction conditions (temperature, pressure, flow rates, etc.).

The polymerizations were conducted in a continuous gas phase fluidized bed reactor having an internal diameter of 45 cm and a reaction zone height of 140 cm. The fluidized bed was made up of polymer granules. The reactor was filled with a bed of about 40 kg of dry polymer particles that was vigorously agitated by a high velocity gas stream. The bed of polymer particles in the reaction zone was kept in a fluidized state by a recycle stream that works as a fluidizing medium as well as a heat dissipating agent for absorbing the exothermal heat generated within reaction zone.

The individual flow rates of ethylene, hydrogen and comonomer were controlled to maintain fixed composition targets. The ethylene concentration was controlled to maintain a constant ethylene partial pressure. The hydrogen/ethylene flow ratio was well controlled to maintain a relatively steady melt index of the final resin. The concentrations of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate of about 12 kg/hr.

The reacting bed of growing polymer particles was maintained in a fluidized state by the continuous flow of the make-up feed and recycle gas through the reaction zone. A superficial gas velocity of 0.40 m/sec was used to achieve this. The reactor was operated at a pressure and temperature as shown in below tables. To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber. The so obtained product was purged to remove entrained hydrocarbons and treated with a small steam of humidified nitrogen to deactivate any trace quantities of residual catalyst.

The properties of the polymer were determined by the following test methods:

TABLE 1

| | |
|---|---|
| Melt Index | ASTM D-1238 - Condition E (190° C., 2.16 kg) |
| Density | ASTM D-1505 |
| Bulk Density | The resin is poured in a fixed volume cylinder of 400 cc. The bulk density is measured as the weight of resin divided by 400 cc to give a value in g/cc. |
| Average Particle Size | The particle size is measured by determining the weight of material collected on a series of U.S. Standard sieves and determining the weight average particle size based on the sieve series used. |
| Fines | The fines are defined as the percentage of the total distribution passing through a 120 mesh standard sieve. This has a particle size equivalent of 120 microns. |

A transition was made from a polymerization using a Ziegler-Natta catalyst to a metallocene catalyst.

The Ziegler-Natta catalyst was prepared by impregnating a titanium chloride, magnesium chloride, and tetrahydrofuran (THF) complex into silica support from a solution of THF. The silica is first dehydrated at 600° C. to remove water and chemically treated with tri-ethyl aluminum to further remove the remaining water. The catalyst was treated by adding tri-n-hexylaluminum (TNHAL) and di-ethylaluminum chloride (DEAC) in isopentane solution and dried to become the final Ziegler-Natta catalyst. The final catalyst had a titanium content of 1% and DEAC/THF mole ratio of 0.42 and TNHAL/THF ratio of 0.28.

The metallocene catalyst was made as follows:

At room temperature, 0.595 kg of diphenyl(2-indenyl)$_2$ZrCl$_2$ was added to 36.968 kg of a 30% methylaluminoxane solution (Al content 13.58 wt %) and stirred for 30 minutes to form activated metallocene. About 172 kg of dry toluene was added to 43 kg of silica 955 to form a silica slurry. At about 30° C., the activated metallocene was added to the silica slurry under agitation. After the activated metallocene was added, the temperature was increased to 50° C. After 2 hours at 50° C., Atmer 163 (commercially available ethoxylated tertiary amine) was added. After addition the mixture was kept at 50° C. for 1 hour. The reaction temperature was then reduced to 30° C. The toluene was removed by filtration and the obtained catalysts composition was dried by raising the temperature to 55° C. and using a flow of warm nitrogen. The Al/Zr ratio used in this experiment was approximately 150.

Reference Experiment 1

The plant reactor was charged with 45 kilograms of a "seed bed" of a linear low density polyethylene having a flow index of 1.0 and density of 918 kg/m³ produced earlier in another reactor through copolymerizing ethylene and butene-1 using the Ziegler-Natta catalyst.

The transition was started by feeding TIBAL-Amine about an hour earlier than the metallocene catalyst feeding at 0.12 kg/h feed rate at reactor temperature of 85° C., ethylene partial pressure of 8.5 bar, and C6/C2 of 0.115.

The development of density and melt index (MI) over time at an average T=87° C., and C6/C2=0.115 showed a typical stability of the resin properties in terms of density and melt index as continuously produced from the pilot plant reactor and analyzed every two hours. The density was about 918 kg/m3 and the melt index was about 1.0.

The above catalyst under the above process condition produced the desired product with a gel content (total defect area) of less than 40 ppm according to the following method:

Method 1

A film was made by an extruder and the film was inspected with a detector from Optical Control Systems GmbH (OCS). The OCS equipment measures the defects.

The equipment used consisted of an Optical Control Systems GmbH (OCS) Model ME-20 extruder, and OCS Model CR-8 cast film system, and an OCS Model FSA-100 gel counter. The ME-20 extruder consists of a ¾" standard screw with 3/1 compression ratio, and 25/1 L/D. It includes a feed zone, a compression zone, and a metering zone. The extruder utilizes all solid state controls, a variable frequency AC drive for the screw, 5 heating zones including 3 for the barrel, 1 for the melt temperature and pressure measurement zone, and one for the die. The die was a 150 mm fixed lip die of a "fishtail" design, with a die gap of about 5 mm.

The total defect area (TDA) of the film is defined as:

TDA (ppm)=Total Defect Area (mm$^2$)/Inspected Area (m$^2$)

The gel size (μm) is classified in 0-300
300-600
600-1000
1000-1200
>1200

The reactor was opened and the reactor wall was inspected. The reactor wall was clean with no wall fouling.

It can therefore be concluded that a satisfactory copolymer can be obtained by copolymerizing using the metallocene catalyst.

Reference Experiment 2

The catalyst feeder was charged with the Ziegler-Natta catalyst for priming the catalyst feeder with the Ziegler-Natta, followed by dumping and intensive purging with nitrogen.

Nitrogen purging was done continuously for about three hours. Once purging was done, priming with a metallocene catalyst was done through charging 150 g of the catalyst to the catalyst feeder followed by intensive mixing inside the catalyst reservoir or tank; a non-rotating component adjacent to the metering disc.

After an hour of mixing, the metallocene catalyst used for priming was dumped to flush the whole feeder system that comprises a metering disc; a surface of contact between the metering disc and the non-rotating component, a drive shaft, a pickup section; and an injection tube.

Once this was done, intensive purging of the catalyst feeder via purified nitrogen was done aiming at removing any remaining "contaminated" metallocene catalyst. The above procedure of catalyst feeder's priming and purging was repeated three times using the metallocene catalyst. Subsequently, 300 g of the metallocene catalyst was introduced to the catalyst feeder.

Subsequently, the same procedure of charging the reactor with resin and feeding of TIBAL-Amine was followed as the reference experiment 1:

The reactor picked up immediately and within four hours of polymerization, the production rate reached about 9.5 kg/h. No sudden increase in production rate was observed nor any change in the measured density and melt index.

Since there was no free THF in the reactor from a previous polymerization using Ziegler-Natta catalyst, there was no effect on the progression of resin properties of melt index and density.

The gel content (TDA) of the on-spec powder in terms of density and melt index were analyzed and found to be extremely excessive exceeding an average of 20,000 PPM.

Such excessive gels were not expected due to the intensive purging and priming done to the catalyst feeder.

Reference Experiment 3

After reference experiment 2, priming and flushing with the metallocene catalyst was done in the same way as in reference experiment 2. Subsequently the catalyst feeder was charged with 320 g of the metallocene catalyst.

Expectedly, the reactor picked up immediately and within two hours of polymerization, the production rate reached about 10 kg/h without any change in the measured density and melt index.

Since there was no free THF in the reactor from a previous polymerization using Ziegler-Natta catalyst, there was no effect on the progression of resin properties of melt index and density.

The gel content (TDA) of the on-spec powder in terms of density and melt index were analyzed and found to be extremely excessive exceeding an average of 10,500 PPM.

Such excessive gels were not expected due to the intensive purging and priming done to the catalyst feeder.

Most of the observed gel was very high molecular weight gel.

Reference Experiment 4

Reference experiment 2 was repeated except that the catalyst feeder primed with M1 catalyst was physically cleaned before being fed with a metallocene catalyst. The gel content (TDA) of the obtained copolymer was only up to 25 PPM.

Preparation of M1 Catalyst:

Under a dry nitrogen atmosphere, a Schlenk flask was charged with silica (Davison 955, 33 g), previously calcined at 600° C. for 4 hours, and 19 ml of 1 M of triethylaluminum (TEAL) in isopentane was added to the silica to form a slurry. The slurry was kept at 37° C. for 1.0 hour. Then, 4 g of MgCl2 and 2.46 g of TiCl3 were dissolved in 1.5 liter of THF (100%) at 75° C. for 2 hours in a three nick bottom flask (Mg/Ti molar ratio of 3.1). After dissolving MgCl2-TiCl3 precursor in THF the solution was transferred into a Schlenk flask with TEAL on Silica and mixed for another hour at 75° C. Drying took place at 105° C. then 100° C. under nitrogen purge to reach 14.0 weight % THF in the final dried catalyst powder. Finally, 4.1 g of neat DEAC was added to the previously dried powder and mixed for 20 minutes followed by the addition of 4.8 g of TnHAL for 30 minutes then drying took place at 65° C. to obtain the free flowing catalyst.

From reference experiments 2-4, it can be concluded that the reason for the high level gellation is the Ziegler-Natta catalyst remaining in the catalyst feeder system. An amount of Ziegler-Natta catalyst remains in the catalyst feeder even after intensive purging, which is sufficient for interfering with the copolymerization process using the metallocene catalyst.

It can be concluded that this problem can be solved by using separate catalyst feeders for the Ziegler-Natta catalyst and for the metallocene catalyst.

The invention claimed is:

1. A process for transitioning from a first continuous polymerization reaction in a gas phase reactor conducted in the presence of a first catalyst to a second polymerization reaction conducted in the presence of a second catalyst in the gas phase reactor wherein the first and second catalysts are incompatible, the process comprising:
   (a) discontinuing the introduction of the first catalyst from a first catalyst feeding system into the gas phase reactor;
   (b) introducing a catalyst killer to at least partially deactivate the first catalyst in the gas phase reactor; and
   (c) introducing into the gas phase reactor the second catalyst from a second catalyst feeding system separate from the first catalyst feeding system.

2. The process according to claim 1, wherein the first catalyst is a Ziegler-Natta catalyst and the second catalyst is a metallocene catalyst.

3. The process according to claim 1,
   wherein the second catalyst is a metallocene catalyst composition comprising a support containing a metallocene catalyst, a catalyst activator and an optional modifier.

4. A process for transitioning from a first continuous polymerization reaction in a gas phase reactor conducted in the presence of a first catalyst to a second polymerization reaction conducted in the presence of a second catalyst in the gas phase reactor wherein the first and second catalysts are incompatible, the process comprising:
   (a) discontinuing the introduction of the first catalyst from a first catalyst feeding system into the gas phase reactor;
   (b) introducing a catalyst killer to at least partially deactivate the first catalyst in the gas phase reactor; and
   (c) introducing into the gas phase reactor the second catalyst from a second catalyst feeding system separate from the first catalyst feeding system,
   wherein the second catalyst is a metallocene catalyst composition comprising a support containing a metallocene catalyst, a catalyst activator and an optional modifier, and
   wherein the metallocene catalyst is selected from the group consisting of: [ortho-bis(4-phenyl-2-indenyl)-benzene]zirconiumdichloride, [ortho-bis(5-phenyl-2-indenyl)-benzene]zirconiumdichloride, [ortho-bis(2-indenyl)benzene]zirconiumdichloride, [ortho-bis(2-indenyl)benzene]hafniumdichloride, [ortho-bis(1-methyl-2-indenyl)-benzene]zirconiumdichloride, [2.2'-(1.2-phenyldiyl)-1.1'-dimethylsilyl-bis(indene)]zirconiumdichloride, [2,2'-(1,2-phenyldiyl)-1,1'-diphenylsilyl-bis(indene)]zirconiumdichloride, [2,2'-(1.2-phenyldiyl)-1.1'-(1.2-ethanediyl)-bis(indene)]zirconiumdichloride, [2.2'-bis(2-indenyl)biphenyl]zirconiumdichloride and [2,2'-bis(2-indenyl)biphenyl]hafniumdichloride.

5. The process according to claim 4, wherein the catalyst killer comprises cyclohexylamine.

6. A process for transitioning from a first continuous polymerization reaction in a gas phase reactor conducted in the presence of a first catalyst to a second polymerization reaction conducted in the presence of a second catalyst in the gas phase reactor wherein the first and second catalysts are incompatible, the process comprising:
   (a) discontinuing the introduction of the first catalyst from a first catalyst feeding system into the gas phase reactor;
   (b) introducing a catalyst killer to at least partially deactivate the first catalyst in the gas phase reactor;

(b2) introducing an organometallic compound into the reactor to react with the catalyst killer;
(b3) introducing a gas composition into the reactor for the second polymerization reaction;
(b4) introducing a reaction product of an aluminum compound of general formula (1)

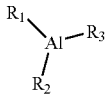
(1)

and an amine compound of general formula (2)

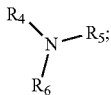
(2)

and
(c) introducing into the gas phase reactor the second catalyst from a second catalyst feeding system separate from the first catalyst feeding system,
wherein
- $R_1$ is hydrogen or a branched or straight, substituted or unsubstituted hydrocarbon group having 1-30 carbon atoms,
- $R_2$ and $R_3$ are the same or different and selected from branched or straight, substituted or unsubstituted hydrocarbon groups having 1-30 carbon atoms,
- $R_4$ is hydrogen or a functional group with at least one active hydrogen,
- $R_5$ is hydrogen or a branched, straight or cyclic, substituted or unsubstituted hydrocarbon group having 1-30 carbon atoms, and
- $R_6$ is a branched, straight or cyclic, substituted or unsubstituted hydrocarbon group having 1-30 carbon atoms.

7. The process according to claim 6, wherein the compound (1) is tri-isobutylaluminum and the compound (2) is cyclohexylamine, octadecylamine, 2-ethylhexylamine, ethylhexylamine, bis(4-aminocyclohexyl)methane, hexamethylenediamine, 1,3-benzenedimethanamine, 1-amino-3-aminomethyl-3,5,5-trimethylcyclohexane and 6-amino-1,3-dimethyluracil or a mixture thereof.

8. The process according to claim 6, wherein the polymerization is conducted in a fluidized bed reactor.

9. The process according to claim 6, wherein the first continuous polymerization reaction is operated in a condensed mode in which 5-17.4 wt % of the gas composition entering the gas phase reactor is liquid or a supercondensed mode in which more than 17.4 wt % of the gas composition entering the gas phase reactor is liquid.

10. The process according to claim 6, wherein the gas phase reactor is a multi-zone reactor operable in condensed mode, which multi-zone reactor comprises a first zone, a second zone, a third zone, a fourth zone and a distribution plate,
wherein the first zone is separated from the second zone by the distribution plate, wherein the multi-zone reactor is extended in the vertical direction,
wherein the second zone of the multi-zone reactor is located above the first zone and wherein the third zone of the multi-zone reactor is located above the second zone, and wherein the fourth zone of the multi-zone reactor is located above the third zone,
wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor,
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor, and
wherein the largest diameter of the inner wall of the third zone is larger than the largest diameter of the inner wall of the second zone.

11. The process according to claim 6, wherein a reversible catalyst killer is introduced to render the first catalyst inactive.

12. The process according to claim 4, wherein the optional modifier is present and is
a reaction product of an aluminum compound of general formula (1)

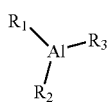
(1)

and an amine compound of general formula (2)

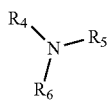
(2)

wherein
- $R_1$ is hydrogen or a branched or straight, substituted or unsubstituted hydrocarbon group having 1-30 carbon atoms,
- $R_2$ and $R_3$ are the same or different and are selected from branched or straight, substituted or unsubstituted hydrocarbon groups having 1-30 carbon atoms,
- $R_4$ is hydrogen or a functional group with at least one active hydrogen,
- $R_5$ is hydrogen or a branched, straight or cyclic, substituted or unsubstituted hydrocarbon group having 1-30 carbon atoms, and
- $R_6$ is a branched, straight or cyclic, substituted or unsubstituted hydrocarbon group having 1-30 carbon atoms, or

[B] an amine compound of general formula (3)

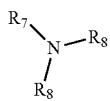
(3)

where
- $R_7$ is hydrogen or a linear or branched alkyl group of from 1 to 50 carbon atoms,
- $R_8$ is a hydroxy group of a $(CH_2)_x$ radical and
- x is an integer from 1 to 50.

13. The process according to claim 12, wherein a reversible catalyst killer is introduced to render the first catalyst inactive.

14. The process according to claim 6, wherein
the compound (1) is tri-isobutylaluminum and the compound (2) is cyclohexylamine; and
the metallocene catalyst is selected from the group consisting of: [ortho-bis(4-phenyl-2-indenyl)-benzene]zirconiumdichloride, [ortho-bis(5-phenyl-2-indenyl)-benzene]zirconiumdichloride, [ortho-bis(2-indenyl) benzene]zirconiumdichloride, [ortho-bis(2-indenyl) benzene]hafniumdichloride, [ortho-bis(1-methyl-2-indenyl)-benzene]zirconiumdichloride, [2.2'-(1.2-phenyldiyl)-1.1'-dimethylsilyl-bis(indene)] zirconiumdichloride, [2,2'-(1,2-phenyldiyl)-1,1'-diphenylsilyl-bis(indene)]zirconiumdichloride, [2,2'-(1.2-phenyldiyl)-1.1'-(1.2-ethanediyl)-bis(indene)]zirconiumdichloride, [2.2'-bis(2-indenyl)biphenyl]zirconiumdichloride and [2,2'-bis(2-indenyl)biphenyl]hafniumdichloride.

15. The process according to claim 13, wherein the catalyst killer comprises cyclohexylamine.

16. The process according to claim 13, wherein the polymerization is conducted in a fluidized bed reactor.

17. The process according to claim 8, wherein the first continuous polymerization reaction is operated in a condensed mode in which 5-17.4 wt % of the gas composition entering the gas phase reactor is liquid or a supercondensed mode in which more than 17.4 wt % of the gas composition entering the gas phase reactor is liquid.

18. The process according to claim 8, wherein the gas phase reactor is a multi-zone reactor operable in condensed mode, which multi-zone reactor comprises a first zone, a second zone, a third zone, a fourth zone and a distribution plate,
wherein the first zone is separated from the second zone by the distribution plate, wherein the multi-zone reactor is extended in the vertical direction,
wherein the second zone of the multi-zone reactor is located above the first zone and wherein the third zone of the multi-zone reactor is located above the second zone, and wherein the fourth zone of the multi-zone reactor is located above the third zone,
wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor
wherein the largest diameter of the inner wall of the third zone is larger than the largest diameter of the inner wall of the second zone.

19. The process according to claim 11, wherein the reversible catalyst killer is CO.

20. The process according to claim 6, wherein the compound (1) is tri-isobutylaluminum and the compound (2) is cyclohexylamine.

* * * * *